United States Patent Office 2,817,581
Patented Dec. 24, 1957

2,817,581

CAST AMMONIUM NITRATE AND UREA EXPLOSIVE

William H. Rinkenbach, Salisbury Township, Lehigh County, and William J. Carroll, Jr., Allentown, Pa., assignors to Trojan Powder Company, a corporation of New York No Drawing. Application May 18, 1955
Serial No. 509,394

4 Claims. (Cl. 52—14)

This invention relates to cast blasting explosives of the non-gelatinized type in which ammonium nitrate is the chief constituent. More particularly, the invention relates to such cast ammonium nitrate explosives containing ammonium nitrate crystals bonded in a fused and then solidified magma of urea and ammonium nitrate.

Various organic amino compounds have been used heretofore as stabilizers with ammonium nitrate. Urea in minor amounts serves as an antacid to neutralize acidity as it develops. Urea has been used also, in conjunction with nitrocellulose and nitroglycerin, in the manufacture of plastic (gelatinized) explosives. In plastic ammonium nitrate explosives, urea has been incorporated along with a freezing point depressant such as sodium acetate, urea nitrate, and sodium chloride.

In no case did the proportion of urea to ammonium nitrate approach the stoichiometric for oxygen balance. In fact, we have found that an approximately oxygen-balanced mixture of ammonium nitrate and urea, when melted and cooled so as to form a cast mixture, is not detonatable even when confined and subjected to the action of a powerful booster explosive. We have now discovered, on the other hand, a balanced cast ammonium nitrate and urea composition that is detonatable and the process of making such explosive.

The invention provides also an explosive that is of greater over-all density than pressed ammonium nitrate alone, in spite of the fact that the added urea is itself of lower specific gravity than ammonium nitrate. It provides an explosive that, while dependably detonatable when confined, is safe in transporting and handling when unconfined and of greater explosive force than ammonium nitrate alone. The invention provides also a method in which the mixed ingredients are heated and settling of the more dense, unfused material is reduced by only partially melting the mass, as compared to the settling which occurs when the mass is more nearly completely melted at the time of casting.

Briefly stated, the invention comprises cast mixed ammonium nitrate, urea and additional sensitizing component in proportions approximately equal to those required stoichiometrically for oxygen balance, a large part of the ammonium nitrate being distributed in crystal form throughout a solidified magma of urea and ammonium nitrate and bonded by the said magma.

It will be understood that the oxygen balance provides oxygen in amount just adequate theoretically to convert the carbon, hydrogen and nitrogen of the explosive mixture, on explosion, to $CO_2$, $H_2O$ and $N_2$, respectively.

The composition is in the condition of having been partially melted and stirred to a mushy viscous slurry in which the unfused heavy ammonium nitrate phase does not settle objectionably during casting of the slurry and subsequent solidification. The mushy viscous slurry may be produced (1) by heating the mechanically mixed ingredients or (2) by mixing a melted mixture of about equal weights of urea and ammonium nitrate (approximately the eutectic proportion of 47% of urea and 53% ammonium nitrate) with the sensitizing component and additional solid ammonium nitrate required to give the desired oxygen balance in the composition.

When the composition partly melted to the viscous slurry, such as made by heating to 50°–100° C., is cast into cylinders or blocks and cooled, the resulting solidified material consists essentially of a solid magma of urea and ammonium nitrate extending between and bonding remaining unmelted crystals of the nitrate, with the sensitizer dispersed in the magma, either dissolved or as solid particles. The proportion of ammonium nitrate does not vary objectionably in different major parts of the mass.

The incorporation of 1–6 parts of certain addends (additional sensitizing component) into the material to be cast makes the final cast and solidified composition satisfactorily detonatable under confinement and yet characterized by safety in handling and transportation without such confinement. Examples of suitable additional sensitizers that illustrate the class of materials to be used are cyclotrimethylene trinitramine, trinitrotoluol (TNT), pentaerythritol tetranitrate, and metals such as aluminum, magnesium, aluminum-magnesium alloy, and ferrosilicon, all introduced in finely divided form except in those instances in which the sensitizer selected is soluble in the magma.

Proportions to be used are 14–20 parts of urea, 1–6 of the sensitizing component consisting of one or more sensitizers, and ammonium nitrate in amount to make 100 parts combined weight of the three classes of materials. With combustible sensitizers or other minor materials incorporated, as in the case of the metals, TNT, rosin and methyl cellulose, the proportion of urea is lowered, within the range stated, to provide for an increased proportion of the oxidizing component (ammonium nitrate), so as to give the maximum explosive power of the final composition. Even in such instances, the increase in nitrate is not above that which would reduce the proportion of urea below 14% of the total composition. Proportions of urea outside the range 14–20 parts by weight per 100 of the composition lead to decrease in the power of explosion and, in some cases, to other undesirable properties.

The invention will be further illustrated by description in connection with the following specific examples of the practice of it. In these examples and elsewhere herein proportions are expressed as parts by weight.

*Example 1*

771 g. of crystalline ammonium nitrate, 179 g. of urea, and 50 g. of cyclotrimethylene trinitramine as the additional sensitizing component were mixed thoroughly and passed several times through a number 10 sieve. The resultant mixture was heated to approximately 50° C. and stirred until partially melted. This gave a mushy, viscous slurry of a molten magma of urea and ammonium nitrate with original crystals of unmelted nitrate and with the sensitizer dispersed in the magma. Heating was continued with stirring until no further increase in fluidity of the resulting slurry was noted on holding at this temperature. The slurry was then poured into cylindrical molds and allowed to cool and solidify.

The cast explosive so obtained was found not to detonate when unconfined and boostered with 100 g. of 60 percent dynamite, but to detonate completely when confined in a steel pipe and subjected to the action of the same booster charge.

Ballistic pendulum tests of the product showed the explosive power to be approximately equal to that of standard 60% dynamite. The cast explosive had an overall or bulk density of 1.41 g. per ml., as compared to 0.98 g. per ml. for pressed ammonium nitrate of the kind used.

Example 2

790 g. of crystalline ammonium nitrate, 190 g. of urea, and 20 g. of cyclotrimethylene trinitramine were mixed, heated, stirred and cast as described under Example 1. The product was found to have almost the same sensitivity and explosive power as the composition obtained as described under Example 1.

Example 3

150 g. of crystalline ammonium nitrate and 140 g. of urea were heated to approximately 90° C. to form a clear liquid. To this molten approximately eutectic material there was added, with constant stirring, 670 g. of crystalline ammonium nitrate and 40 g. of powdered 85% ferrosilicon, the latter as sensitizer. This addition caused the temperature of the liquid to decrease. A viscous slurry of nitrate, ferrosilicon, and liquid resulted. The slurry was then poured into cylindrical molds and cooled quickly to solidify it.

The cast explosive so obtained contained granules of unmelted nitrate, particles of ferrosilicon, and a solidified magma of urea and nitrate, the granules and particles being distributed throughout and bonded by the magma. There was but little settling of the solids from the liquid phase during casting.

The cast explosive failed to detonate when unconfined although boostered with 100 g. of 60 percent dynamite, but detonated when confined in a steel pipe and subjected to the action of the same booster charge.

The explosive power was found to be such that 10 g. of the cast explosive are equal to 10.1 g. of TNT.

Example 4

152 g. of crystalline ammonium nitrate and 152 g. of urea were heated to approximately 90° C. to form a clear liquid. This was added to and stirred with a mixture of 636 g. of crystalline ammonium nitrate and a sensitizer component consisting of 40 g. of nitrostarch and 20 g. of flake aluminum powder. The whole was cooled in a mold of 800 ml. capacity. Upon cooling and solidification, there was obtained a cast explosive having a density of 1.44 g. per ml.

This explosive failed to detonate when unconfined and boostered with 100 g. of 60 percent dynamite, but detonated when confined in a steel pipe and subjected to the action of the same booster charge.

Ballistic pendulum tests of the composition showed it to have such explosive power that 10 g. of the explosive are equal to 10.9 g. of TNT.

Example 5

787 g. of crystalline ammonium nitrate, 168 g. of urea, and sensitizing component consisting of 25 g. of cyclotrimethylene trinitramine and 20 g. of flake aluminum powder were mixed. The mixture was heated to approximately 90° C., and held at that temperature with continuous agitation until partial melting took place and no further increase in the fluidity of the resulting slurry was noted. The slurry was then poured into cylindrical molds and cooled to solidify it quickly. The cast explosive so obtained contained spaced crystals of unmelted nitrate, particles of cyclotrimethylene trinitramine and aluminum, and a solidified magma of urea and nitrate. The thick consistency of the slurry at the time of casting prevents objectionable separation of the solid phase from the liquid during casting.

The product failed to detonate when unconfined although boostered with 100 g. of 60 percent dynamite. It detonated completely when confined in a steel pipe and subjected to the action of the same booster charge.

The explosive power was found to be such that 10 g. of the cast explosive are equal to 10.9 g. of TNT. The density of the cast explosive was 1.37 g. per ml.

The particle size of ammonium nitrate which we have used is such that substantially all of it will pass through a sieve having 10 openings to the linear inch (10 mesh) and less than 50 percent by weight will pass through a 200 mesh sieve. The particles are crystalline.

In addition to ingredients of the class stated, other additives that are conventional in like explosive compositions may be added in usual proportions and for their usual effects.

It is to be understood that it is intended to cover all changes and modifications of the examples of the invention herein chosen for the purpose of illustration which do not constitute departures from the spirit and scope of the invention.

What is claimed is:

1. A cast explosive composition comprising ammonium nitrate, urea, and additional sensitizing component, the proportions being 14–20 parts by weight of urea, 1–6 of the additional sensitizing component, and ammonium nitrate in amount to make 100 parts total of the three materials and the composition being largely in the form of a solidified magma of urea and ammonium nitrate containing the additional sensitizing component dispersed throughout the magma and crystals of ammonium nitrate embedded in the magma and bonded thereby.

2. The composition of claim 1 in which the proportions of ammonium nitrate and urea in the solidified magma are approximately the eutectic proportions.

3. The composition of claim 1 in which the additional sensitizing component is cyclotrimethylene trinitramine.

4. The composition of claim 1 in which the additional sensitizing component is aluminum powder.

References Cited in the file of this patent

UNITED STATES PATENTS

| | | |
|---|---|---|
| 689,577 | Von Dahmen | Dec. 24, 1901 |
| 1,752,391 | Olsen | Apr. 1, 1930 |
| 1,908,044 | Nelson | May 9, 1933 |
| 2,353,147 | Cook et al. | July 11, 1944 |
| 2,411,604 | Wahl | Nov. 26, 1946 |
| 2,455,205 | Whetstone et al. | Nov. 30, 1948 |
| 2,548,688 | Taylor | Apr. 10, 1951 |
| 2,548,693 | Whetstone et al. | Apr. 10, 1951 |
| 2,711,366 | Davidson et al. | June 21, 1955 |
| 2,733,139 | Winning | Jan. 31, 1956 |

OTHER REFERENCES

Colver: High Explosives, publ. 1918, pp. 251, 252.